May 23, 1933.  E. H. REMDE  1,910,364
INDUSTRIAL TRUCK
Filed Nov. 1, 1929   5 Sheets-Sheet 1

INVENTOR
Edward H. Remde
BY
Geo. B. Pitts
ATTORNEY

May 23, 1933.   E. H. REMDE   1,910,364
INDUSTRIAL TRUCK
Filed Nov. 1, 1929   5 Sheets-Sheet 2

INVENTOR
Edward H. Remde
BY Geo. B. Pitts
ATTORNEY

May 23, 1933.  E. H. REMDE  1,910,364
INDUSTRIAL TRUCK
Filed Nov. 1, 1929  5 Sheets-Sheet 5

INVENTOR
Edward H. Remde
BY Geo. A. Pitts
ATTORNEY

Patented May 23, 1933

1,910,364

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed November 1, 1929. Serial No. 403,983.

This invention relates to an industrial truck for elevating and transporting loads, more particularly to a truck of the load tiering type.

One object of the invention is to provide a truck of this character which may be of relatively low height to permit driving of the truck through door ways and below overhead structures, but which is constructed to elevate loads to positions or supports disposed above the normal height of the truck and to remove loads from such positions or supports in a ready manner.

Another object of the invention is to provide a truck having a compound elevating mechanism of relatively simple construction capable of elevating loads to relatively high positions.

Another object of the invention is to provide in a truck having a plurality of relatively movable members for raising and lowering a load, improved means for limiting the movement of the respective members and for taking up cable slack, whereby positive control of the load and relatively movable members results and danger of breakage or displacement of parts is avoided.

A further object of the invention is to provide a tiering truck in which the tiering mechanism is mounted on a rotatable frame to permit of loading and unloading operations at the front and opposite sides of the truck, as well as loading from the floor level or discharge of loads thereon.

Other objects of the invention will be apparent to those skilled in the art to which my invention relates from the following description taken in connection with the accompanying drawings, wherein.

In the drawings, 1 indicates a frame mounted on suitable wheels, certain of which are driven by a motor 2, transmitting power through a suitable transmission mechanism within a housing 3. The frame preferably comprises an elevated section 1a and a drop section 1b. In this form of construction a pair of relatively large wheels 4 are arranged below the elevated section 1a and relatively small wheels 5 are arranged below the drop section. In this arrangement the wheels 4 serve as the traction wheels driven by the transmission mechanism.

4a indicates the axle for the wheels 4, terminating in suitable knuckles 4b, to which the wheels 4 are pivoted (see Fig. 5). 6, 6a indicate seats carried by the frame section 1a and axle 4a for coiled springs 6b. 7 indicates a suspension mechanism for the motor 2 and housing 3 and comprising a pair of U-members. The suspension mechanism is preferably similar to that shown and claimed in Letters Patent No. 1,628,145, dated May 10, 1927. 8 indicates a steering gear preferably connected to both pairs of wheels 4, 5, and simultaneously steering them about a common center by means of a manual steering device 8a. 9 indicates a suitable controller for completing the circuits to the motor, current being supplied by suitable batteries 9a. The controller 9 is supported on an upright portion 12 of the frame 1a and operated by a lever 11. 13 indicates brackets depending from the outer end of the frame section 1a and arranged to pivotally support a platform 14 for an operative. 15 indicates a foot pedal associated with the platform 14 and connected through a linkage to control a brake mechanism 16 which is normally biased into braking position by a spring as is customary in trucks of this general character. 17 indicates a switch mechanism which is connected to the foot pedal 15 or the linkage operated thereby to automatically open or close the motor circuit, the latter being open when the brake is set and closed when the brake is released by the pushing down of the foot pedal 15.

18 indicates a vertical shaft suitably mounted at its lower end on the frame section 1a. 19 indicates a frame swingably mounted at its front portion on the shaft 18. The frame 19 includes a base portion for supporting the batteries 9a, uprights 20 for supporting a pair of cable winding drums 21, 22, a power mechanism 22′ therefore and a motor 23 for the power mechanism and uprights 24 which support an upper bearing 24′ engaging the shaft 18 and co-operating with a bearing 25 at the front end of the base portion to rotatably support the frame 19 on the shaft. The frame 19 carries a gear 26 with which a pinion 26a meshes, the pinion being fixed to a shaft 27 (see Fig. 1) which is driven by a motor, supplied with current from the batteries 9a, the motor, its mounting and driving means being preferably similar to corresponding parts shown in my application Serial No. 679,605 filed December 10, 1923 (see Letters Patent No. 1,777,475).

The uprights 20 and 24 may be braced by tie members 28, 29.

30, 30, indicate a pair of supporting members secured at their inner ends to the inner faces of the uprights 24 and resting on the front base portion 19a of the frame 19, being secured to the latter by angles 31. The supporting members 30 extend outwardly and downwardly to a point beyond and below the low frame section 1b so that the load engaging and lifting device or carrier, indicated as an entirety at 30a, may be projected below loads positioned on the flooring or dunnage on the latter. The outer or free ends of the supporting members 30 are connected to and support a member 32 comprising a pair of guides 32a, preferably formed from I-beams, which extend upwardly to any desired height, but the height thereof is preferably such that the truck may be driven through doorways or openings of normal height and below overhead structures or beams without engagement therewith. The beams 32a are preferably rigidly secured to the members 30, by rivets 33. When so connected to the members 30, the upper ends of the beams 32a are braced by struts 34 connected to the uprights 24 and tie members 29, being connected to the struts by angles 34a, which in turn are connected by a cross member 34b. The upper ends of the guides are connected together in rigid spaced relation by a plate 35.

Figure 6:
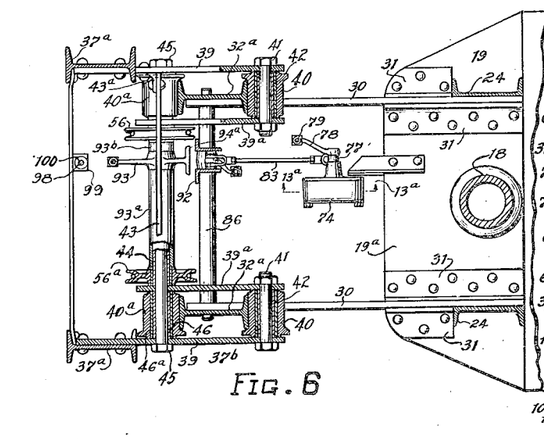
Fig. 6 is a fragmentary section partly on the line 6—6 and partly on the line 6a—6a of Fig. 5.

36 indicates as an entirety the tiering mechanism, this mechanism being of the compound type and comprising a plurality of relatively movable members, whereby the carrier 30a may be raised to a position above the member 32 which constitutes the inner or stationary member of this mechanism. I have in the present embodiment of the invention, shown three relatively movable members, to wit the member 32 (already referred to), a member 37 and a member 38, the latter carrying the load carrier 30a. The member 37 comprises a pair of guides 37a preferably formed from I-beams and a shoe member 37b slidably engaging the guides 32a and movable from end to end thereof. The shoe member 37b consists of pairs of plates 39—39a, 39—39a (see Figs. 3 and 6), the plates of each pair being disposed upon opposite sides of one guide 32a and supporting between them rollers 40, 40a, which roll on the flanged surfaces of the beams 32a. The plates 39—39a of each pair are secured together at their inner ends by a bolt 41 which clamps the plates against a spacing sleeve 42 surrounding the bolt and disposed between the plates. The sleeve 42 is provided with a sleeve bushing on which the adjacent roller 40 rotates. The outer end of each plate 39 is rigidly secured to the web portion of the adjacent beam 37a and the plates 39a are rigidly connected in spaced relation by a cross member 43, each end of the latter being secured to the adjacent plate by angles 43a. The lower portions of the plates 39—39a, 39—39a, are formed with aligned openings for a through-rod 44, threaded at its ends to take nuts 45, which are tightened against the outer plates 39; there being suitable spacing sleeves 46 on the rod between the plates. The sleeve between each pair of plates 39—39a on the rod 44 is provided with a suitable bushing on which loosely rotates the adjacent roller 40a.

Figure 2:
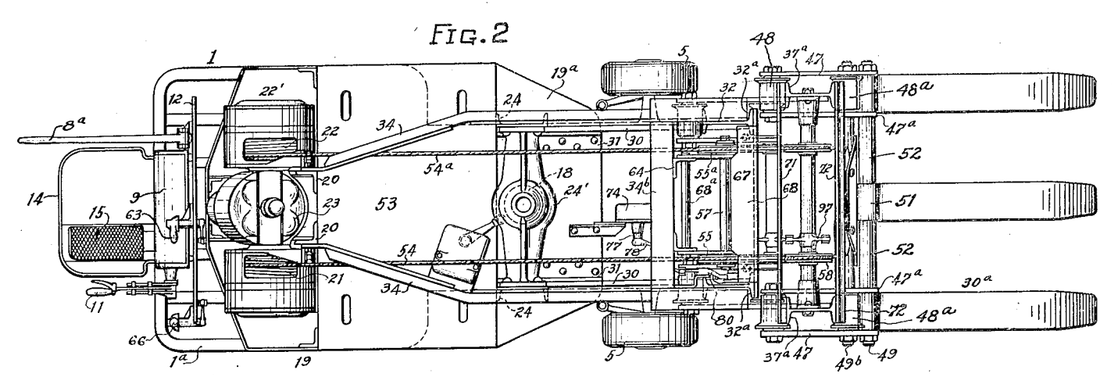
Fig. 2 is a plan view of the truck.
Figure 3:
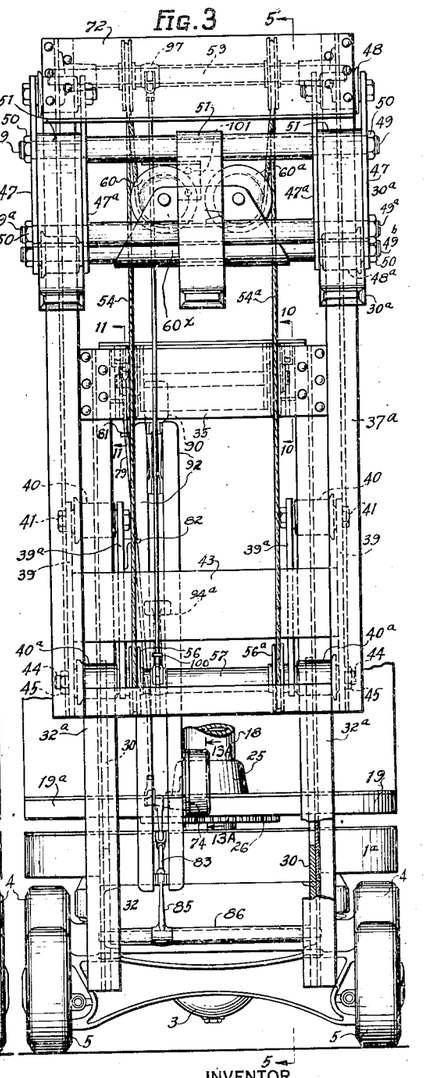
Fig. 3 is a front view (enlarged), parts being broken away, showing the tiering mechanism in operated position with the load carrier elevated.
Figure 4:
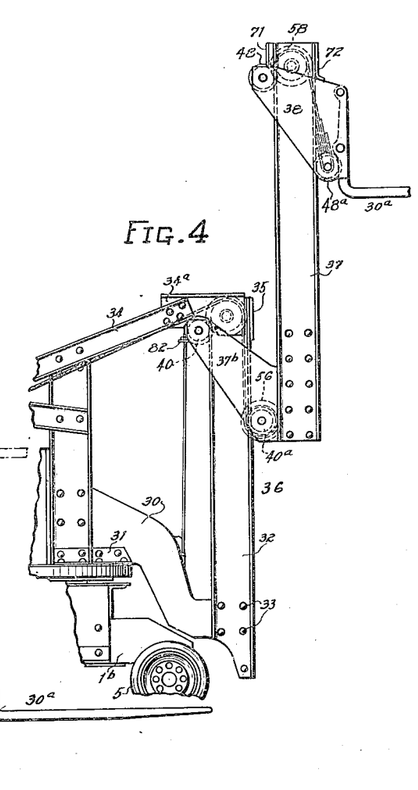
Fig. 4 is a fragmentary view of parts shown in Fig. 3 in side elevation, and showing the load carrier elevated to its extreme upper position.

The member 38 comprises pairs of plates 47—47a, 47—47a, the plates of each pair being disposed upon opposite sides of one of the guides 37a and supporting between them rollers 48, 48a, which roll on the flanged surfaces of the guide (see Figs. 2 and 3). The inner ends of each pair of plates 47—47a are secured together in the same manner as the inner ends of the plates 39—39a and such securing means support the adjacent roller 48 similarly to the roller 40. The outer portions of the plates 47—47a, 47—47a, are formed with sets of aligned openings to receive through-rods 49, 49a, 49b, the rods 49, 49a, being disposed adjacent the front edges of the plates and the rod 49b being disposed adjacent their lower ends. The opposite ends of the rods are threaded to take nuts 50 which are tightened against the outer plates, spacing sleeves (hereinafter referred to), being provided between the plates to maintain their spacing when the nuts 50 are tightened against the outer plates. As shown, the rod 49b supports the rollers 48a between the plates 47—47a, 47—47a, respectively.

Figure 7:
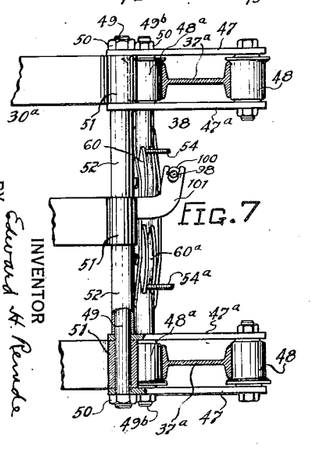
Fig. 7 is a section on the line 7—7 of Fig. 5.
Figure 8:
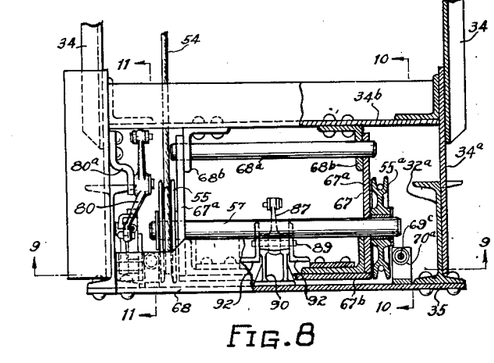
Fig. 8 is a top view of parts shown in Figs. 2, 3, 4, 5 and 9, partly in section on the line 8—8 of Fig. 9.
Figure 9:
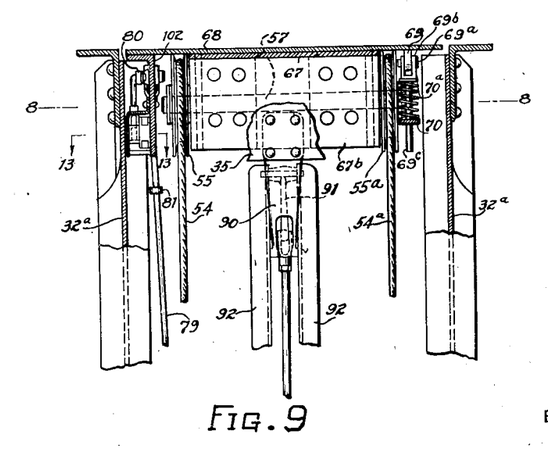
Fig. 9 is a fragmentary section on the line 9—9 of Figs. 1 and 8.
Figure 10:
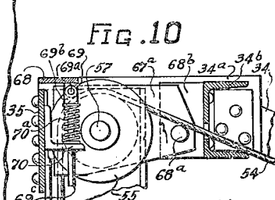
Fig. 10 is a section on the line 10—10 of Fig. 8.
Figure 11:
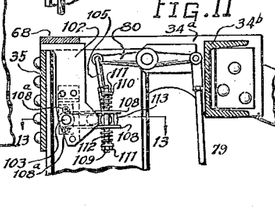
Fig. 11 is a section on the line 11—11 of Fig. 8.

The carrier 30a may consist of a suitable device or devices or a platform or other form of support, forming part of or mounted on the outermost member so as to engage and carry bodies or loads or different shapes and character or such device, platform or support may be provided with suitable elements or members adapted to pick up various kinds of loads; and such device, platform or support may be removable to permit of the substitution of another form of load carrier. In the illustrated form of construction the carrier comprises a plurality of L-shaped members, their vertical legs being provided with hollow bosses 51 through which the rods 49, 49a, extend to support these members on the relatively movable member 38. As shown, the bosses 51 on the outermost L-shaped members are disposed between the plates 47—47a, 47—47a, respectively, and serve as the spacing sleeves already referred to, whereas the bosses on the intermediate L-shaped member co-operate with sleeves 52 on the rods 49, 49a, to space the plates 47a, 47a (see Fig. 7).

53 indicates as an entirety means for moving the movable members 37 and 38 relative to the member 32 and each other, such means including the drums 21, 22 and the driving means therefor, already referred to, whereby the carrier 30a may be raised to any desired height and lowered. The moving means 53 also include flexible members, such as steel cables, the inner ends of which wind on or off the drums 21, 22, when the motor 23 is driven.

In the form of construction shown in Figs. 1 to 10, inclusive, I provide two cables 54, 54a, which are connected to the outer most movable member 38 and interconnected to the inner members 37, 32, in a manner to be later set forth to effect their relative movement one to the other; whereas in Figs. 14 and 15 I show a slightly modified arrangement in which the cables connected to the drums at their inner ends and at their outer ends are connected to the intermediate member and interconnected with the inner member and a separate cable or cables are connected to the inner member and outer member and interconnected with the intermediate member. In the form of construction shown in Figs. 1 to 7, inclusive, I may provide a plurality of intermediate relatively movable members and in the form of construction shown in Figs. 14 and 15 a plurality of members may be provided between the outer and inner members to which each cable or each pair of cables are connected.

Referring to Figs. 1 to 10, the cable 54 extends from the drum 21 to and around a sheave 55 mounted at the upper end of the guides 32a on a shaft 57 in the manner hereinafter described, then to and around a sheave 56 mounted on the cross shaft 44 suitably supported at the lower end of the guides 37a, then to and around a sheave 58 mounted on a shaft 59 suitably supported at the upper end of the guides 37a and then to and around a sheave 60 swingably supported by the rod 49b and its outer end may extend to a suitable anchor or an equalizer, but in the preferred construction it is connected to the outer end of the cable 54a, thereby forming a single length of cable. The cable 54a extends from the drum 22 to and around a sheave 55a mounted similarly to the sheave 55, then to and around a sheave 56a mounted on the shaft 44, then to and around a sheave 58a mounted on the shaft 59, and then to and around a sheave 60a, the outer or free end of the cable 54a being preferably connected to the outer end of the cable 54, as already set forth. The sheaves 60, 60a, are mounted in a yoke 60x which encircles the rod 49b, whereby the sheaves accommodate themselves to the position of the cables.

Figures 5, 13A, 14:
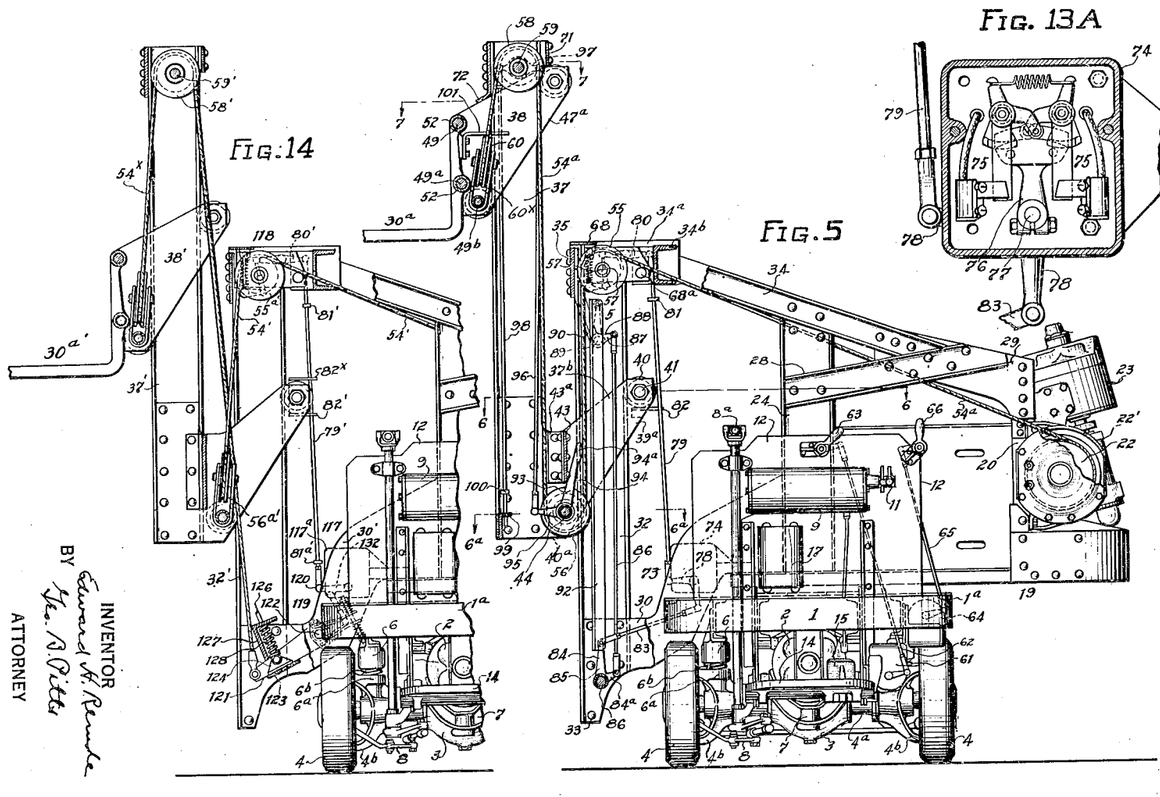
Fig. 5 is a view partly in elevation and partly in section on the line 5—5 of Fig. 3 and showing the supporting frame for the tiering mechanism rotated to one load handling position.
Fig. 13A is a section on the line 13A—13A of Fig. 3.
Fig. 14 is a fragmentary view showing a slightly different form of tiering mechanism, with the supporting frame rotated to one operating position; this view being partly in section on the line 14—14 of Fig. 15.

The drums 21, 22, are connected to a shaft, driven by the motor 23 through the gear mechanism 22′, to drive both drums in either direction so that both cables 54, 54a, are either wound on or paid out therefrom. 61 indicates a controller for controlling the supply of current to the motor 23, the drum of the controller being connected by linkage 62 with an operating handle 63 mounted on the upright portion 12. 64 indicates a controller for controlling the supply of current to the motor (not shown) which through a suitable driving mechanism drives the pinion 26a, the drum of the controller being connected by linkage 65 with an operating handle 66 mounted on the upright portion 12 (see Fig. 5).

The mounting for the sheaves 55, 55a is preferably arranged to take up slack in the cables 54, 54a. For this purpose I provide the following mechanism: 67 indicates a frame comprising side plates 67a, a front plate 67b and a supporting member 68 arranged to rest on the upper edge of the plate 35 (see Figs. 8, 9, 10 and 11). The rear ends of the side plates 67a are formed with aligned openings to receive the opposite ends of a shaft 68a which has support in a pair of brackets 68b carried by the plate 34b. The outer portions of the side plates 67a are formed with aligned openings in which is supported the shaft 57 carrying on its ends outwardly of the side plates, the sheaves 55, 55a (see Fig. 9). 69 indicates a pair of lugs depending downwardly from the plate 68 and each formed with an opening for a pivot 69a on which is pivoted a bifurcated element 69b carrying a depending rod 69c. The lower portion of each rod 69c loosely fits and extends through an opening formed in a bracket 70 which is secured to the inner face of the plate 35. Between each bracket 70 and the body portion of the adjacent bifurcated element 69b and surrounding the rod, is a coiled expansion spring 70a normally tending to swing the frame 67 upwardly about the shaft 68a (see Fig. 9). Accordingly, it will be understood that the springs 70a will, through the frame 67 and shaft 57, tend to swing the sheaves 55, 55a, upwardly and maintain the cables taut and also take up any slack occurring therein by reason of the carrier 30a or member 38 engaging an obstruction in the downward movement of either thereof.

In raising the carrier 30a, by winding of the cables 54, 54a, on the drums 21, 22, it will be understood that it and the member 38 first move upwardly as a unit relative to the member 37 until the member 38 engages the upper end of the member 37, such movement being limited by the rollers 48 engaging a cross member 71 and the plates 47a engaging a cross member 72, and further upward movement of the carrier takes place by the continued winding of the cables on the drums the effect of which is to move the member 37 upwardly relative to the member 32; and when the cables are payed out to lower the carrier 30a, the latter, the member 38 and member 37 first move downwardly as a unit relative to the member 32, such movement being limited by the engagement of the rollers 40 with the plates 30, and thereafter the carrier 30a and member 38 move downwardly as a unit relative to the member 37.

73 indicates as an entirety a limit switch mechanism arranged to open the circuit and stop the motor 23 when the member 37 reaches the upward limit of its movement or when the member 38 reaches the downward limit of its movement.

The limit switch mechanism also includes a connection with the slack take-up frame 67, so that if undue slack occurs in the cables 54, 54a, the swinging of the frame 67 will open the motor circuit to prevent the paying out of the cables. By connecting the slack take-up means to the limit switch mechanism 73, a single pair of switches, to be later referred to, may be utilized to open the motor circuit when undue cable slack occurs or when the relatively movable members 37, 38, reach their extreme positions, respectively.

Of the limit switch mechanism, 74 indicates a casing supported by a bracket on the front end of the frame 19 (see Figs. 2 and 13A). The casing encloses a pair of switches 75, the movable contact of each of which is operated to open and closed position by a member 76 fixed to a rock shaft 77, a spring being connected to the rock shaft 77 to normally maintain it in mid position, so that the motor circuits for driving the motor in either direction are closed and one thereof is opened by the member 76 through the operating connections to be hereafter described when the member 37 reaches the upward limit of its movement and the other thereof is opened by the member 76 through the operating connections when the member 38 reaches the downward limit of its movement. No claim is made herein to the switches and their operating member since the same forms the subject-matter of Letters Patent No. 1,726,717 dated September 3, 1929. The rock shaft 77 carries on its outer end a bell crank 78 to one arm of which is pivotally connected a rod 79 extending upwardly at a slight inclination to the vertical for reason later to be set forth (see Fig. 5). The upper end of the rod 79 is pivotally connected to a lever 80 the purpose of which will later appear, the lever being fulcrumed on a bracket 80a (see Fig. 8). Near its upper end the rod 79 carries an adjustable tappet 81 adapted to be engaged by an arm 82 fixed to and extending inwardly from the adjacent plate 39a, when the member 37 reaches its limit of upward movement. From the foregoing description it will be understood that when the member 37 moves upwardly, as already described, to the limit of its movement, the arm 82 will engage the tappet 81 and through it move the rod 79, which in turn through the bell crank 78, shaft 77 and member 76 will open one of the switches 75, thereby stopping the motor 23. In the downward movement of the member, the arm 82 clears the rod and bell crank 78, since the rod is inclined inwardly at its lower end, as already described. The other arm of the bell crank 78 has connected to it the inner end of a link 83. The outer end of the link 83 is pivotally connected to one arm 84 of a bell crank 85 mounted on a cross shaft 86 supported by the guide beams 32a at their lower ends (see Fig. 5). The other or inner arm 84a of the bell-crank 85 has pivoted to it the lower end of a rod 86, which at its upper end is pivoted to the corresponding arm 87 of a second bell crank 88. The bell crank 88 is fulcrumed on a shaft or pin 89 supported at the lower end of a bracket 90 depending from the plate 35 between the guides 32a. Between the other arm 91 of the bell crank 88 and the arm 84 extends a movable member preferably comprising a pair of flat strips 92, pivotally connected to and supported by the lever arms parallel to the guides 32a. The strips 92 extend substantially from end to end of the members 32 and being mounted on the levers 85 and 88, which are connected together by the rod 86, pressure or thrust movement on the strips 92 at any point throughout their length will move them inwardly without changing their parallel relation to the beams 32a and by reason of the connection of the lever arm 84 with the link 83, such inward movement will, through the link 83, bell crank 78, shaft 77 and member 76 open one of the switches 75, and thereby stop the motor 23. 93 indicates a bell crank preferably fulcrumed on the shaft 44, being interposed between sleeves 93a, 93b, which space the sheaves 56, 56a, and with the latter assist in spacing the plates 39a (see Fig. 6). The inner arm 94 of the bell crank 93 extends upwardly and carries at its outer end a thrust member 94a movable in the vertical plane of and in operative relation to the strips 92 so that when the bell crank swings on its fulcrum the thrust member 94a will engage with and move the strips inwardly and open one of the switches, as already described. The other arm 95 of the bell crank 93 has pivoted to it the lower end of a rod 96. The upper end of the rod 96 is pivoted to the inner end of a lever 97 fulcrumed on the shaft 59. The other end of the lever 97 has pivoted to it the upper end of a rod 98, which extends downwardly parallel to the guides 37a, the lower end of the rod extending through and slidably fitting an opening formed in an angle member 99 carried by a cross bar fixed to the adjacent guides. Above the angle member 99 the rod 98 carries an adjustable tappet 100 adapted to be engaged by an arm 101 carried by the member 38, so that when the latter reaches its downward limit of movement, the arm 101 will engage the tappet 100 and move the rod 98 endwise. This movement is transmitted through the lever 97 and rod 96 to the bell crank 93, which through the thrust member 94a will effect opening of one of the switches 75, as already explained.

The lever 80, which serves as one of the connecting elements between the cable slack take-up means and the rod 79 to open one of the switches 75 when the frame 67 swings unduly, is connected with such means in a manner that permits operation of the rod 79 by the arm 80 or its movement when the arm 101 operates the rod 98 without affecting its connection with the slack take-up means.

Figures 1, 12:
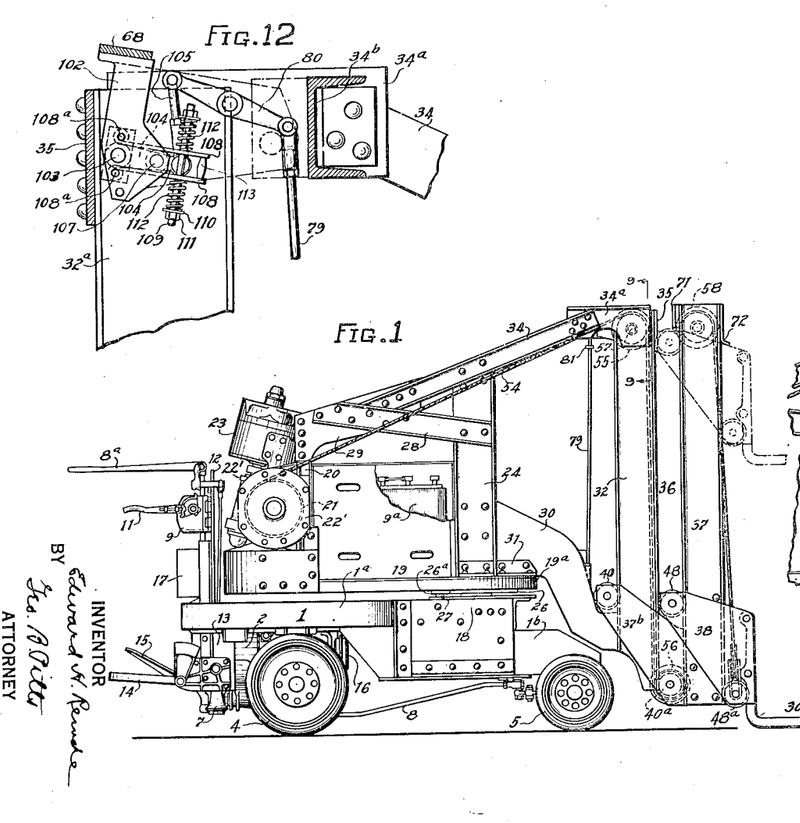
Fig. 1 is a side elevation of a truck embodying my invention, parts being broken away.
Fig. 12 is a section similar to Fig. 11, but showing the position of the parts when the slack take-up frame is operated.
Figure 13:
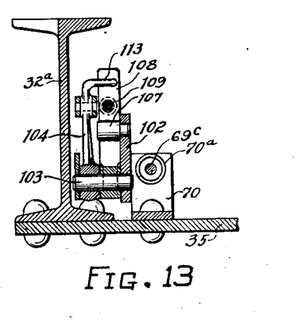
Fig. 13 is a fragmentary section on the line 13—13 of Fig. 9.

102 indicates a support fixed to and depending from the cross plate 65. At its lower end the support 102 carries a stud shaft 103 on which is pivoted a lever 104, which, in mid position, preferably extends inwardly substantially horizontally (see Figs. 11 and 13). The outer end of the lever 104 is pivoted to the lower end of a link 105. The upper end of the link 105 is pivotally connected to the adjacent end of the lever 80. 107 indicates a lug carried by the support 102 (see Fig. 13) preferably disposed in the horizontal plane of the shaft 103. 108 indicates upper and lower plates disposed on opposite sides of the lug 107, their inner ends being pivoted on pins 108a disposed parallel to the shaft 103. The outer portions of the plates 108 are formed with aligned openings elongated longitudinally of the plate and receive a rod 109 having on its ends suitable collars 110 held thereon by nuts 111 to form abutments for a pair of compression springs 112 coiled around the rod, one spring being interposed between each plate and the adjacent abutment. As a result of this arrangement the springs 112 will normally maintain the plates 108 in engagement with the lug 107 and the rod 109 supported in the position shown in Fig. 11. 113 indicates a finger carried by the outer end of the lever 104 and extending laterally into the space between the outer ends of the plates 108 (see Fig. 13), so as to swing either plate according to the direction of movement of the arm 104 about its pivot 103. If the rod 79 is moved in either direction, as already explained, the lever 80 will be rocked and the latter in turn will move the link 105 and swing the arm 104. The arm 104 through the finger 113 will move one of the plates about its pivot 108a against the tension of the adjacent spring 112 and thus permit operation of the lever without affecting the slack take-up mechanism or its connection therewith. If the slack take-up frame swings upwardly unduly under the influence of the springs 70a, as shown in Fig. 12 due to the member 38 or carrier 30a meeting with an obstruction, the support 102 will carry with it the inner end of the arm 104 and through the engagement of the stud 107 with the upper plate 108, and the engagement of the latter with the upper end of the rod 109 through the adjacent spring 112 and collar 110, the rod will be raised; the rod 109 in turn, through the collar 110 at its lower end and the adjacent spring 112 will lift the lower plate 108, which, through its engagement with the finger 113, will move the outer end of the arm 104 upwardly, thereby moving the arm 104 bodily with the support 102; such bodily movement will move the link 105 and effect swinging movement of the lever 80, which in turn, through the rod 79 and parts connected thereto, will open one of the switches 75 and stop the motor 23.

Figure 15:
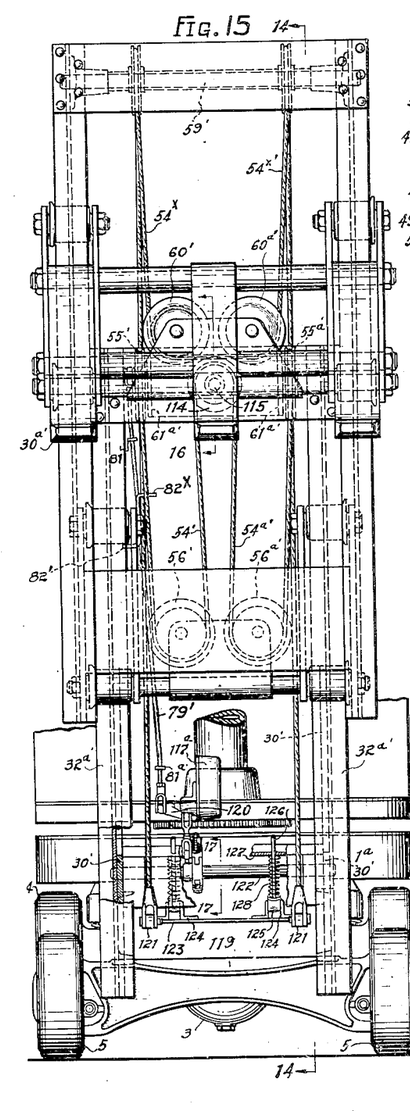
Fig. 15 is a front view (enlarged) of the parts shown in Fig. 14, but showing the supporting frame for the tiering mechanism in its mid position.
Figure 16:
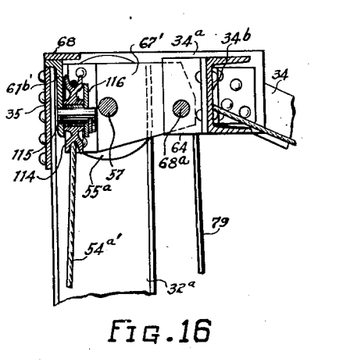
Fig. 16 is a fragmentary section on the line 16—16 of Fig. 15.

Referring to Figs. 14 and 15, the construction of the truck frame, its mounting and driving means, also the construction of the supporting frame for the tiering mechanism and the construction and mountings of the relatively movable members 32', 37', 38' and carrier 30a' are preferably similar to that shown in Figs. 1 to 10, as already described, but the arrangement of the raising and lowering means is slightly changed, as already referred to, as follows: The cables 54', 54a', extend from the drums 21, 22, respectively, to and around sheaves 55', 55a', mounted at the upper end of the guides 32a', these sheaves being mounted similarly to the sheaves 55, 55a. From the sheaves 55', 55a', the cables extend to and around sheaves 56', 56a', and then to and around a sheave 114 mounted on a shaft 115, being connected together at their outer ends and forming a single length of cable, so that when the drums are rotated to wind the inner ends of the cables thereon, the member 37' will be raised relative to the member 32'. The shaft 115 is supported by the front plate 61b' of the slack take-up frame 61' and a yoke 116 secured to the front plate 61b', as shown in Fig. 16. To effect movement of the member 38' and carrier 30a' when the member 37' is raised or lowered I provide a pair of cables 54x, 54x', the inner ends of which are connected to the lower end of the member 32' or the arms 30' in the manner to be later set forth. From the lower end of the member 37' the cables 54x, 54x', extend upwardly to and around sheaves 58' 58a', supported on a shaft 59' at the upper end of the member 37' and from the sheaves 58', 58a', the cables extend to and around sheaves 60' 60a' mounted on the member 38' similarly to the sheaves 60, 60a, their outer ends being connected and forming a single length of cable.

In this arrangement of the cables 54', 54a', 54x, 54x', the member 38' moves simultaneously with the member 37 in either direction of movement of the latter relative to the member 32', but as the cables 54x, 54x', are connected to relatively stationary elements, the member 38' moves twice as fast as the member 37', so that when the latter is raised from the lowest position its full distance of travel, the member 38' travels the full length of the member 37' and is thus elevated to its extreme upper position. In the downward movement of the members 37' relative to the member 32', the member 38' travels the full length of the member 37' to its lowest position.

In this form of construction I provide a limit switch mechanism, indicated as an entirety at 117, a slack take-up mechanism for the cables 54', 54a', indicated as an entirety at 118, and a separate slack take-up mechanism, indicated as an entirety at 119, for the cables 54x, 54x', both take-up mechanisms being connected with the limit switch mechanism 117, so that a single pair of switches serves to stop the motor when the member 37' reaches its limit of movement in either direction or when undue slack occurs in either pair of cables, 54'—54a', 54x—54x'. The limit switch mechanism comprises pairs of switches enclosed in a casing 117a. The pair of switches and the operating member therefor are similar in construction to like parts already described and shown in Fig. 13A; the operating member being fixed to a rock shaft carrying a lever 120. The lever 120 has pivoted to it the lower end of a rod 79'. The upper end of the rod 79' is pivotally connected to a lever 80' (Fig. 14), forming the connection between the limit switches and the slack take-up mechanism 118, which is preferably similar in construction to the take-up mechanism already described (shown particularly in Figs. 10, 11 and 12), and such mechanism is connected to the lever 80' similarly to like connections also hereinbefore described. As the relatively movable member 38' reaches the limit of its movement in either direction at the time the relatively movable member 37' reaches its limit of movement in the corresponding direction, the rod 79' carries two tappets 81', 81a' (each adjustably connected thereto), so that in the upward movement of the member 37' the arm 82' carried thereby will engage the tappet 81' and move the rod 79' in one direction and open one of the switches and in the downward movement of the member 37' an arm 82x will engage the tappet 81a' and move the rod in the other direction and open the other switch. I preferably provide two arms (82'—82x) and arrange them (see Fig. 15) so that the arm 82x will clear the tappet 81' in the upward movement of the member 37' and the arm 82' will clear the tappet 81a' in the downward movement of the member 37'.

The slack take-up mechanism 119 comprises the following: 121 indicates a pair of levers fixed at their inner ends to a rock shaft 122, suitably supported at its ends in the arms 30'. The outer ends of the levers 121 are connected to the inner ends of the cables 54x, 54x', respectively (Fig. 15). 123 indicates a base plate extending between and connected to the levers 121. The upper face of the plate 123 carries pairs of angles 124 between each pair of which is pivotally mounted a collar 125 provided with an upwardly extending rod 126 which loosely fits and extends through an opening formed in a cross member (preferably an L-shaped bar) 127 suitably secured to the opposed faces of the arms 30'. Between each collar 125 and the cross member 127 and surrounding the adjacent rod 126 is a coiled expansion spring 128 normally tending to move the base plate downwardly. As both springs 128 are similarly mounted both normally act on the plate 123 and through it tend to swing the levers 121 downwardly and thus take up any slack that may occur in the cables 54x, 54x'.

Figure 17:
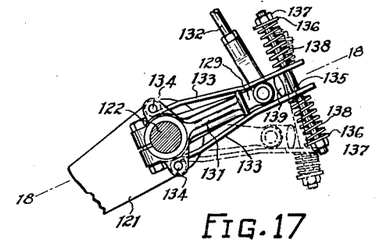
Fig. 17 is a fragmentary section on the line 17—17 of Fig. 15.
Figure 18:
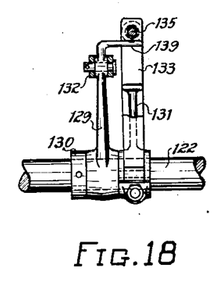
Fig. 18 is a view of parts shown in Fig. 17, partly in section on the line 18—18 thereof.

The connections between the slack take-up mechanism 119 and the limit switch mechanism 117 preferably consists of the following: 129 indicates an arm rotatably mounted on the shaft 122 and held against movement endwise thereof by a collar 130 fixed to the shaft and the hub of a second arm 131, which hub is also fixed to the shaft as shown in Figs. 17 and 18. The arm 129 is pivotally connected to the lower end of a link 132; the upper end of the latter being pivotally connected to the arm 120 (see Fig. 14). 133 indicates a pair of upper and lower plates pivoted at their outer ends on pins or stud shafts 134 mounted on the hub of the arm 131 on diametrical sides of the axis thereof. The free ends of the plates are formed with openings through which extends a rod 135. The opposite ends of the rod 135 are provided with collars or washers 136 held thereon by nuts 137 and between each collar 136 and the adjacent plate 133 is a compression spring 138 coiled around the rod; the two springs co-acting to normally maintain the plates 133 in engagement with a finger 139 carried by the arm 129 and supporting the rod 135 in the position shown in Figs. 14 and 17. The operation of these connections is as follows: when the limit switch mechanism operates to open the circuit for the motor which winds up or pays out the cables 54a, 54a', due to the engagement of the arm 82' with a tappet 81' or 81a', the arm 120 will move the link 132 and it in turn through the finger 139 will swing one of the plates 133 about its pivot 134 as shown in dotted lines in Fig. 17 against the tension of the adjacent spring 138 without operating or affecting the slack take-up mechanism 119, the other plate 133 being held against the arm 131. In the event the slack take-up mechanism 119 operates the arm 131 will be operated by the shaft 122 and if the swing of the shaft is great enough due to an undue amount of slack occurring in the cables 54x, 54x', one of the switches of the limit switch mechanism will be operated, thus opening the circuit to the motor and stopping the paying out of the cables 54', 54a'. The latter operation is effected as follows: The levers 121 will rock the shaft 122 and the shaft will swing the arm 131; the arm will engage and swing the upper plate 133, which through the adjacent spring 138 and its abutment collar 136 will move the rod 135 with it; the rod 135 through the other collar 136 and adjacent spring will move the lower plate 133 upwardly, and the lower plate through the finger 139 will swing the arm 129 and transmit its movement to the link 132; and the link 132 through the arm 120 will open one of the switches of the limit switch mechanism.

In my construction of truck, the relatively movable members of the tiering mechanism may be arranged in the position shown in Fig. 1 to pick up loads supported on the flooring and also to permit the truck to be driven through doorways and below overhanging structures, at the same time the outer members of such mechanism may be operated to elevate the load engaging and carrying member to levels considerably higher than the minimum height of the truck. In addition to the foregoing characteristic, the tiering mechanism is mounted on a rotatable frame which may position the tiering mechanism in front or at either side of the truck frame for operation throughout its entire range of vertical movement. As shown, the tiering mechanism and the batteries and driving mechanism with its motor are mounted on opposite sides of the shaft about which the supporting frame rotates, so that the weight of the batteries, driving mechanism and motor have a counterbalancing effect on the weight of the tiering mechanism and the load which may be carried thereby.

From the foregoing description it will be seen that I provide take-up mechanism for the pair of cables in the form of construction shown in Figs. 1, 2, 3 and 4 and for each pair of cables in the form of construction shown in Figs. 14 and 15, and that each such mechanism is connected with the limit switch mechanism so that if either or both of the outer relatively movable members (or the carrier which is connected to the outermost member) meets with an obstruction in its or their downward movement the motor, which rotates the drums to pay out the cables therefrom, will be automatically stopped, and thus prevent continued paying out of the cables and damage that might result therefrom. It will also be noted that in both forms of construction I provide means for automatically stopping the drum motor when the carrier, or the member on which it is mounted, reaches its limit of movement in either direction so that danger of overrun and damage is eliminated.

To those skilled in the art to which my invention relates, many changes in construction and widely differing embodiments and applications of the invention will suggest themselves without departing from the spirit and scope thereof. My disclosures and the description herein are purely illustrative and not intended to be in any sense limiting.

What I claim is:

1. In an industrial truck, the combination of a wheel mounted frame, a supporting frame rotatably mounted thereon, a support carried by said supporting frame and extending outwardly and downwardly beyond the end of said wheel mounted frame when said rotatable frame is in mid position and arranged to clear said wheel mounted frame when said rotatable frame is moved in either direction from its mid position, and a tiering mechanism including a vertical guide mounted on the outer end of said support and a load carrier slidably mounted on said guide and arranged to be projected below a load on the floor to lift it or discharge a load thereon.

2. In an industrial truck, the combination of a wheel mounted frame, a supporting frame rotatably mounted thereon, a support carried by said supporting frame and extending outwardly and downwardly beyond the end of said wheel mounted frame when said rotatable frame is in mid position and arranged to clear said wheel mounted frame when said rotatable frame is moved in either direction from its mid position, and a tiering mechanism mounted on the outer end of said support, said mechanism comprising a series of members movable relatively to each other into progressively arranged extended positions, the innermost member being connected to said support and the outermost member having a carrier arranged to be projected below a load, and means for operating said movable members.

3. In an industrial truck, the combination of a wheel mounted frame, a tiering mechanism mounted on said frame and comprising a series of members movable relatively to each other into a progressively arranged extended position, the innermost member being connected to said frame and the outermost member having a carrier, cables connected with said members for effecting relative movement thereof, means for operating said cables, and means operating when the outermost member reaches its limit of movement in one direction for stopping the cable operating means, said means including an operating element carried by said outermost member and connections carried by the remaining members and disposed in operative relation during relative movement of said members.

4. In an industrial truck, the combination of a wheel mounted frame, a tiering mechanism mounted on said frame and comprising a series of members movable relatively to each other into a progressively arranged extended position, the innermost member being connected to said frame and the outermost member having a carrier, cables connected with said members for effecting relative movement thereof, means for operating said cables, and means for stopping the cable operating means, said stopping means including connections operated by the outermost member when it reaches its limit of movement in one direction and separate connections operated by another member when the latter reaches its limit of movement in the opposite direction.

5. In an industrial truck, the combination of a wheel mounted frame, a tiering mechanism mounted on said frame and comprising a series of members movable relatively to each other into a progressively arranged extended position, the innermost member being connected to said frame and the outermost member having a carrier, cables connected with said members for effecting relative movement thereof, means for operating said cables, and means operating when the outermost member reaches its limit of movement in either direction for stopping the cable operating means, said stopping means being operated by the intermediate member in its upward movement and being operated by the outermost member in its downward movement.

6. In an industrial truck, the combination of a wheel mounted frame, a tiering mechanism mounted on said frame and comprising a series of members movable relatively to each other into a progressively arranged extended position, the innermost member being connected to said frame and the outermost member having a carrier, cables connected with said members for effecting relative movement thereof, means for operating said cables, and means operating when the outermost member reaches its limit of movement in either direction for stopping the cable operating means, said stopping means including a longitudinally extending movable element and a thrust element for operating said element, one said element being mounted on the innermost member and the other element being mounted on the intermediate member, and devices movably supported on the latter and connected to the element carried by it and arranged to be engaged and operated by the outermost member when it reaches its limit of movement in one direction.

7. In an industrial truck, the combination of a wheel mounted frame, a tiering mechanism mounted on said frame and comprising a series of members movable relatively to each other into a progressively arranged extended position, the innermost member being connected to said frame and the outermost member having a carrier, cables connected with said innermost member and the remaining members for effecting movement of the latter, means for operating said cables, and means operating when the outermost member reaches its limit of movement in either direction for stopping the cable operating means, said stopping means including a movable element extending longitudinally of the innermost member, a thrust element movably mounted on the intermediate member for operating the movable element, and devices movably supported on the latter member and connected to said thrust element, and arranged to be engaged and operated by the outermost member when it reaches its limit of movement in one direction.

8. In an industrial truck, the combination of a wheel mounted frame, a member comprising a pair of spaced guides mounted at one end of the frame, a second member comprising a pair of spaced guides and pairs of plates, each pair of plates being disposed upon opposite sides of one of the first mentioned guides and provided with rollers engaging therewith to slidably support said second member thereon, a third member comprising pairs of plates each disposed upon opposite sides of one of the guides of said second member and provided with rollers engaging therewith to slidably support said second member thereon, a carrier on said third member, and a cable engaging the upper end of the first mentioned member, lower end of the second member and upper end of the latter and connected to the third member, whereby pull on said cable will effect relative movement between said members.

9. In an industrial truck, the combination of a wheel mounted frame, a member comprising a pair of spaced guides mounted at one end of the frame, a second member comprising a pair of spaced guides and pairs of plates, each pair of plates being disposed upon opposite sides of one of the first mentioned guides and provided with rollers engaging therewith to slidably support said second member thereon, a third member comprising pairs of plates each disposed upon opposite sides of one of the guides of said second member and provided with rollers engaging therewith to slidably support said second member thereon, a carrier on said third member, a sheave mounted at the upper end of the first mentioned member, sheaves mounted at the lower and upper ends of the second member, and a cable running over said sheaves and connected to said third member, whereby pull on said cable will effect relative movement between said members.

10. In an industrial truck, the combination of a wheel mounted frame, a member comprising a pair of spaced guides mounted at one end of the frame, a second member comprising a pair of spaced guides and pairs of plates, each pair of plates being disposed upon opposite sides of one of the first mentioned guides and provided with rollers engaging therewith to slidably support said second member thereon, a third member comprising pairs of plate each disposed upon opposite sides of one of the guides of said second member and provided with rollers engaging therewith to slidably support said second member thereon, a carrier on said third member, a sheave mounted at the upper end of the first mentioned member, sheaves mounted at the lower and upper ends of the second member, a cable running over said sheaves and connected to said third member, whereby pull on said cable will effect relative movement between said members, and a spring operated frame for carrying one of said sheaves arranged to take up slack occurring in said cable.

11. In an industrial truck, the combination of a wheel mounted frame, a member comprising a pair of spaced guides mounted at one end of the frame, a second member comprising a pair of spaced guides and pairs of plates, each pair of plates being disposed upon opposite sides of one of the first mentioned guides and provided with rollers engaging therewith to slidably support said second member thereon, a third member comprising pairs of plates each disposed upon opposite sides of one of the guides of said second member and provided with rollers engaging therewith to slidably support said second member thereon, a carrier on said third member, a sheave mounted at the upper end of the first mentioned member, sheaves mounted at the lower and upper ends of said second member, a cable running over the sheave at the upper end of the first mentioned member and the sheave at the lower end of the second member and connected to the upper end of the first mentioned member, and a separate cable fixedly connected to the lower end of the first member and running over the sheave at the upper end of the second member and connected to the third member, whereby pull on the first mentioned cable will effect relative movement between said members.

12. In an industrial truck, the combination of a wheel mounted frame, a member comprising a pair of spaced guides mounted at one end of the frame, a second member comprising a pair of spaced guides and pairs of plates, each pair of plates being disposed upon opposite sides of one of the first mentioned guides and provided with rollers engaging therewith to slidably support said second member thereon, a third member comprising pairs of plates each disposed upon opposite sides of one of the guides of said second member and provided with rollers engaging therewith to slidably support said second member thereon, a carrier on said third member, a sheave mounted at the upper end of the first mentioned member, sheaves mounted at the lower and upper ends of said second member, a cable running over the sheave at the upper end of the first mentioned member and the sheave at the lower end of the second member and connected to the upper end of the first mentioned member, a separate cable fixedly connected to the lower end of the first member and running over the sheave at the upper end of the second member and connected to the third member, whereby pull on the first mentioned cable will effect relative movement between said members, and means for taking up slack in one of said cables.

13. In an industrial truck, the combination of a wheel mounted frame, a member comprising a pair of spaced guides mounted at one end of the frame, a second member comprising a pair of spaced guides and pairs of plates, each pair of plates being disposed upon opposite sides of one of the first mentioned guides and provided with rollers engaging therewith to slidably support said second member thereon, a third member comprising pairs of plates each disposed upon opposite sides of one of the guides of said second member and provided with rollers engaging therewith to slidably support said second member thereon, a carrier on said third member, a sheave mounted at the upper end of the first mentioned member, sheaves mounted at the lower and upper ends of said second member, a cable running over the sheave at the upper end of the first mentioned member and the sheave at the lower end of the second member and connected to the upper end of the first mentioned member, a separate cable fixedly connected to the lower end of the first member and running over the sheave at the upper end of the second member and connected to the third member, whereby pull on the first mentioned cable will effect relative movement between said members, and separate means for taking up slack in each of said cables.

14. In an industrial truck, the combination of a wheel mounted frame, a member comprising a pair of spaced guides mounted at one end of the frame, a second member comprising a pair of spaced guides and pairs of plates, each pair of plates being disposed upon opposite sides of one of the first mentioned guides and provided with rollers engaging therewith to slidably support said second member thereon, a third member comprising pairs of plates each disposed upon opposite sides of one of the guides of said second member and provided with rollers engaging therewith to slidably support said second member thereon, a carrier on said third member, a sheave mounted at the upper end of the first mentioned member, sheaves mounted at the lower and upper ends of said second member, a cable running over the sheave at the upper end of the first mentioned member and the sheave at the lower end of the second member and connected to the upper end of the first mentioned member, a separate cable fixedly connected to the lower end of the first member and running over the sheave at the upper end of the second member and connected to the third member, whereby pull on the first mentioned cable will effect relative movement between said members, operating means for effecting pull on or paying out of the first mentioned cable, separate means for taking up slack in each of said cables, and means common to said slack take-up means for stopping said cable operating means when undue slack occurs in either cable.

15. In an industrial truck, the combination of a wheel mounted frame, a member comprising a pair of spaced guides mounted at one end of the frame, a second member comprising a pair of spaced guides and pairs of plates, each pair of plates being disposed upon opposite sides of one of the first mentioned guides and provided with rollers engaging therewith to slidably support said second member thereon, a third member comprising pairs of plates each disposed upon opposite sides of one of the guides of said second member and provided with rollers engaging therewith to slidably support said second member thereon, a carrier on said third member, a sheave mounted at the upper end of the first mentioned member, sheaves mounted at the lower and upper ends of said second member, a cable running over the sheave at the upper end of the first mentioned member and the sheave at the lower end of the second member and connected to the upper end of the first mentioned member, a separate cable fixedly connected to the lower end of the first member and running over the sheave at the upper end of the second member and connected to the third member, whereby pull on the first mentioned cable will effect relative movement between said members, operating means for effecting pull on or paying out of the first mentioned cable, means for stopping said cable operating means when said third member reaches its limit of movement in one direction, and connections between each said take-up means and said stopping means for effecting operation of the latter when undue slack occurs in either cable.

16. In an industrial truck, the combination of a wheel mounted frame, a tiering mechanism mounted on said frame and comprising a series of members movable relatively to each other into a progressively arranged extended position, the innermost member being connected to said frame and the outermost member having a load carrier, a cable connected with said innermost member and the remaining members for effecting movement of the latter, means for operating said cable, and means carried by one of said members and operatively engaging said cable for taking up slack therein.

17. In an industrial truck, the combination of a wheel mounted frame, a tiering mechanism mounted on said frame and comprising a series of members movable relatively to each other into a progressively arranged extended position, the innermost member being connected to said frame and the outermost member having a load carrier, a cable connected with said innermost member and the intermediate member of the series, means for operating said cable, a separate cable having its inner end relatively fixed and connected to said intermediate member and outermost member, and means for taking up slack occurring in said separate cable.

18. In an industrial truck, the combination of a wheel mounted frame, a tiering mechanism mounted on one end of said frame and comprising a series of members movable relatively to each other into a progressively extended position, the innermost member being connected to said frame and the outermost member having a load carrier, a cable connected with said innermost member and the intermediate member of the series, means for operating said cable, and a separate cable having connection with said frame at its inner end and connected to said intermediate member and outermost member, said connection for the inner end of said separate cable including means for taking up slack occurring therein.

19. In an industrial truck, the combination of a wheel mounted frame, a tiering mechanism mounted on one end of said frame and comprising a series of members movable relatively to each other into a progressively extended position, the innermost member being connected to said frame and the outermost member having a load carrier, a cable connected with said innermost member and the intermediate member of the series, means for operating said cable, a separate cable having its inner end relatively fixed and connected to said innermost member and said outer member, and means for taking up slack occurring in each of said cables.

20. In an industrial truck, the combination of a wheel mounted frame, a pair of inner and outer relatively movable guides, said inner guide being mounted on said frame, a carrier movable on said outer guides, a support mounted at the upper end of said guides and carrying a sheave, a cable running over said sheave and connected to said carrier, operating means for effecting pull on or paying out of said cable, a rod associated with said outer guide and carrying an adjustable tappet arranged to be engaged by said carrier when moving in one direction, a limit switch mechanism for stopping said cable operating means, and connections between said rod and said limit switch mechanism, said connections including devices which effect operation of said limit switch mechanism at any predetermined position of said carrier according to the adjustment of said tappet.

21. In apparatus of the class described, the combination of a guide, a carrier movable along said guide, a flexible member connected to said carrier for operating it, operating means for effecting pull on or paying out said flexible member, a limit switch mechanism for stopping said operating means, devices connected with said mechanism arranged to be engaged and actuated by said carrier, means for taking up slack in said flexible member, and connections between an element of said slack take-up means and said devices, said connections including a swingable arm, a link between the free end of said arm and said devices, a pair of pivoted plates, a member movable with said movable element and disposed between said plates, a finger carried by said arm and disposed between said plates, a device associated with said plates and having abutments at its opposite ends and a compression spring between each said abutment and the adjacent plate.

In testimony whereof, I have hereunto signed my name.

EDWARD H. REMDE.